United States Patent Office 3,440,894
Patented Apr. 29, 1969

3,440,894
TRACTANTS AND METHOD OF USE
William C. Hammann, Creve Coeur, and Robert M. Schisla, Kirkwood, Mo., assignors to Monsanto Company, St. Louis, Mo., a corporation of Delaware
No Drawing. Continuation-in-part of application Ser. No. 586,358, Oct. 13, 1966. This application Aug. 15, 1967, Ser. No. 660,574
Int. Cl. F16h 15/08
U.S. Cl. 74—200        31 Claims

ABSTRACT OF THE DISCLOSURE

Improvements in tractive drives are afforded through use of certain cyclic and acyclic carbon-containing compounds, herein called tractants, as the fluid component of the drives. The tractants of the invention, when disposed on the tractive surfaces, provide increased traction as compared to conventional fluids. The tractants disclosed herein are defined by limitations on chemical structure, with a minimum coefficient of traction defined as 0.06.

---

This application is a continuation-in-part of our copending application, Ser. No. 586,358, filed Oct. 13, 1966.

Traction is broadly defined as the adhesive friction of a body on a surface on which it moves. Tractive devices, as considered in light of the present invention, are those devices in which torque is transmitted through nominal point or line contact, typically with a rolling action. Although sometimes referred to as friction drives, such devices are more appropriately described as tractive drives. A tractive drive, in simplified form, could comprise two parallel cylindrical rollers in tangential contact, one roller being the input member and the other the output member. The torque capacity of such a tractive drive is a direct function of the contact pressure between the rollers and the coefficient of traction of the roller surfaces. The phrase "coefficient of traction" is preferred instead of "coefficient of friction" in order to connote rolling contact.

The traction existing at the rolling contacts of ball and roller bearings, although considered detrimental in most applications, can be used to transmit tangential force. If the coefficient of traction and the normal load on the rolling bodies are sufficient to prevent slipping, any ball or roller bearing can serve as a prototype of a tractive drive.

A distinguishing feature of tractive drives is that torque is generally transmitted therein from one member to another member by traction generated through nominal point or line contact. This is in contrast with a true friction drive such as an automotive friction clutch or a belt drive where torque is transmitted through area contact. When point contact or line contact are referred to herein, the term nominal is employed to signify that the actual contact area is something greater than that of a point or a line.

To further distinguish tractive drives from friction drives, consider the definition of friction. Friction is defined as the resistance to relative motion between two bodies in contact. In friction drives, a high resistance to relative motion is desired. Thus, advantage is taken of the resistance to relative motion of two or more bodies in contact to provide means for transmitting torque. In friction drives, therefore, it is desirable, under stabilized speed conditions, to have a high coefficient of friction, thus minimizing or avoiding any rolling or sliding contact between members; whereas, tractive drives, as defined above, intentionally incorporate some form of relative motion between the load carrying members, and this relative motion is not in the form of slippage. A familiar example of a friction drive comprises an input member and an output member having mating wedged surfaces wherein the surface material possesses a high coefficient of friction. The surface material can be fiber, asbestos, leather, etc. Increased torque capacity is achieved therein by tighter wedging of the members, the latter being engaged with area contact and having no slippage or relative motion therebetween.

The rolling contact principle has been employed to produce tractive drives far more complex than the double roller example hereinbefore cited. Infinitely variable ratios can be obtained with many tractive drive units. Typical uses for tractive drives are in automatic transmissions in automotive vehicles, variable speed drives for machinery, constant speed drives for aircraft accessories, and power transmission units for land and marine vehicles. In machine shop equipment, for example, there are many requirements for variable speed drives such as in feed control and cutting speed control on lathes, cylindrical grinders, boring mills, milling machines, drilling machines, etc.

One variable speed tractive drive with a 5 horsepower rating and speed ratios between 3:1 and 5:1 has found use in the textile industry as well as the machine tool industry. A miniature tractive drive has been designed for extremely low-power applications, e.g., in cardiographs, computers, optical drives, oscillographs, timers, servomechanisms, and process controllers.

There are at least seven basic drives which can be employed in the design of infinitely variable tractive devices. These drives are categorized in the following manner:

(1) Disc and sliding-roller type, with full reversibility
(2) Double-disc and sliding-roller type, reversible by changing contact from one disc to the other
(3) Two discs interconnected by a sliding roller
(4) Cone and sliding-roller type
(5) Two spherical cones and free-spinning roller
(6) Spherical cones and tilting balls
(7) Toroidal discs and tilting rollers Although the above elements would normally be metal, a tractive drive comprising non-metallic elements such as reinforced fiber, hard rubber, or plastics such as nylon, modified styrenebutadiene copolymers, polycarbonates, etc., would be useable.

There are many commercial embodiments of tractive devices comprising the aforementioned drives. One configuration features a floating steel ring rolling on two steel double cones. One cone of each double cone can be displaced axially, while the other is rigidly attached to its respective shaft. The ring, therefore, can occupy any position between the maximum and minimum diameters of the cones, providing infinitely variable output speeds between these limits. Line-contact pressure between the ring and the cones develops automatically and is proportional to the load.

Another tractive drive configuration is similar to that of a compound planetary-gear system, except that the non-rotating member is a traction ring which engages tapered rollers at varying diameters. The traction or control ring can be moved axially to change speed. The rollers are supported in a carrier, and are inclined at an angle equal to their taper, so that their outer edges are maintained parallel to the central axis. The required tractive pressure between rollers and ring is obtained through the centrifugal force of the rollers themselves.

Several tractive drives employing toroidal discs and tilting rollers have been made. In each case there are several rollers loaded between an input toroidal disc and an output toroidal disc, the rollers being capable of rotation into various angular positions to change the speed ratio. The toroidal disc and roller units can be compounded in a tractive drive assembly.

Still another commercial tractive drive employs a series of tilting balls in contact with two spherical cone members. The balls are drilled through their centers to receive spindles which facilitate tilting. When the cones act on equal diameters of the balls, the input and output speeds are equal. However, when the axes of the balls are tilted, one cone will operate on a reduced ball diameter and the other on an increased ball diameter. The balls can be tilted in either direction, giving an overall infinitely variable ratio of 9:1.

Another variable speed device which could be considered as a tractive drive is a roller chain drive in which power is transmitted by traction between a special wedge-type roller chain and smooth conical wheels. In one embodiment of this drive, each link of the chain contains cylindrical rollers with convex or spherical ends, which, in the direction of travel, bear against the enclosing cage-like side bars of the links, but which are free to rotate about their principal axis. When the chain enters the wheels, the rollers of each link wedge themselves tightly into the V's formed by the conical wheels, the roller ends carrying out a rotary motion on the working surfaces of the wheels and on their own lines of contact.

Yet another tractive drive within the scope of this invention features stacks of flanged discs and tapered discs in power transmitting relationship. A thin film of fluid is provided between the driving and driven discs. Output speed is varied by changing the depth to which the flanged discs are inserted between the tapered discs, thereby altering the effective diameter of the tapered discs, while that of the flanged discs remains constant.

While numerous embodiments of tractive drives have been described above, it is to be understood that the present invention is directed to all types of relatively rotatable members in torque transmitting relationship where the coefficient of traction has significance. Thus, there is no limitation herein to particular types or classes of tractive devices in the mechanical sense.

Among the advantages of tractive drives are smooth and quiet operation, positive mechanical drive, high efficiency, continually variable ratio under load, and simplicity. In contrast to the more conventional drives, both torque and speed can be transmitted uniformly by tractive drives, with no torsional pulsations. This smoothness is especially valuable since this is basically a positive mechanical drive wherein the nominal overall ratio is determined by the geometry of the rolling bodies and is only slightly affected by elastic creep in the contacts. Furthermore, overall efficiencies well above 90% can be achieved for tractive drives having both rolling and spinning in the contacts. For drives having pure rolling contact, efficiencies of 99% are known. This latter figure is the same as or better than the efficiency of a pair of helical gears of the same power capacity.

One of the most important characteristics of tractive drives is their ability to change ratio continually under full load without power interruption during ratio changing. This characteristic cannot be achieved with gear drives and is obtained in certain types of hydraulic drives only at a substantial sacrifice in efficiency. Tractive drives can be designed so that the output speed for a given input speed is infinitely variable between some set maximum and minimum limits, between some maximum limit and zero, or between some maximum limit and beyond zero in the range of reverse speeds. The external forces required to bring about a ratio change can be very small compared to the magnitude of the power transmitted, thus making tractive drives very attractive for servo-type control systems. Still another advantage lies in the easily machineable shape of the contacting elements.

Tractive drives have some recognized limitations, the most significant of which are torque capacity and durability. Since transmittable power depends on the magnitude of the traction, and this traction in turn depends on the force applied at the point of contact, specific contact pressure must be very high if power output is substantial. This high pressure tends to reduce the fatigue life of the tractive drive components. Although this problem can be partially overcome by the provision of more than one contact point or by nominal line contact, the torque capacity of tractive drives for a given physical size is still less than desired, and this deficiency severely limits the widespread use of tractive drives.

The magnitude of the tangential force which is transmitted through a given rolling contact is directly proportional to the product of the normal load acting on the contact and the coefficient of traction existing between the two bodies. If it is assumed that the effect of tangential load on the life of rolling contacts is small relative to the effect of normal load, the fatigue life of a tractive drive can be estimated from rolling contact bearing data obtained under similar loads. Thus, the life of a rolling contact element is inversely proportional to approximately the cube of the normal load whereas the torque capacity is only directly proportional to the normal load. Increasing the torque capacity through increasing the coefficient of traction, therefore, is far more desirable than by increasing the normal load.

While tractive elements are commonly spoken of as being in contact, it is generally accepted that a fluid film is provided therebetween. Almost all tractive drives require fluids to remove heat, to prevent wear at the contact surfaces, and to lubricate bearings and other moving parts associated with the drive. Thus, instead of metal-to-metal rolling contact, there is a film of fluid introduced into the load zone. The nature of this fluid has a profound effect on the coefficient of traction of the drive.

The coefficient of traction for a tractive device can be defined as the ratio of the tangential or tractive force to the normal load. The upper limiting value of the coefficient of traction is the coefficient of traction at slip, which is observed when the rolling contact is on the verge of gross slip. In a given tractive drive, coefficient of traction can be computed by knowing the normal load on the contact and by simultaneously measuring the tractive force. An expression for coefficient of traction is:

$$f_t = F_t/P_n$$

where $F_t$=tangential or tractive force, $P_n$=normal load, and $f_t$=coefficient of traction.

Experimental work on tractive drives has shown that the coefficient of traction is affected by rolling velocity, normal load on the contacts, fluid composition, fluid temperature, and roller surface topography. Since fluid composition is considered to be the key variable of the group for the purpose of effecting improvements in the torque capacity of a given tractive device, coefficients of traction are herein assigned to the fluids themselves by comparative test means in order to properly classify their tractive merits. Hence, when a coefficient of traction is ascribed to a fluid, it is a relative measure of the tractive effect of that fluid in a tractive device.

Inherent in any tractive drive are certain load limitations based on the physical size of the parts, on design numbers, and metallurgical characteristics. To obtain a reasonable fatigue life on the working parts, therefore, a definite torque limit must be established and thereafter adhered to. Many factors must be evaluated in arriving at a safe torque limit, or more specifically, a safe normal load. Careful consideration must be given to measuring the coefficient of traction of the fluid to be employed therein. Some variation in tractive properties among different batches of a given fluid would be expected, hence a factor of safety should be provided in the normal load limit to compensate therefor.

Another factor bearing on the normal load limit concerns spin losses. Spin losses, or torque losses, are inherent in any variable ratio tractive drive. These are attributed to the relative rotation, about an axis perpendicular to the contact zone, between the contact zone on one tractive member and the corresponding zone on the mating member. Spin losses increase with increasing normal load. Hence, better efficiency will be attained if the normal load can be reduced while maintaining the desired output torque, and this can be achieved with a fluid having an increased coefficient of traction.

From the standpoint of potential improvement in torque capacity, the key component of a tractive drive is the tractive drive fluid, and the key property of the fluid is its coefficient of traction. The advantages of finding fluids with increased coefficients of traction have been recognized for some time by those engaged in the development of tractive devices, and they have expended considerable effort for this purpose. These efforts, however, have been confined to the evaluation of commercially available petroleum oil fractions, synthetic oils and oil additives for the purpose of finding fluids with improved coefficients of traction and other desired properties, such as viscosity, lubricity, oxidation stability, anticorrosion, and anti-foaming. The lubricants hitherto available for tractive applications, however, do not possess those properties which produce the high coefficient of traction necessary for improved torque capacity, and these efforts have not led to practical fluids which coefficients of traction substantially superior to those of the best petroleum oil fractions. Hence, the torque capacity of known tractive drives is lower than that which is desired for many commercial applications.

In addition to efforts to obtain fluids having increased coefficients of traction by the evaluation of available oils, much theoretical and experimental work reported in the technical literature in recent years has been devoted to obtaining an understanding of tractive drives and rolling contact phenomena which could lead to the design of fluids of improved coefficient of traction. Although such an understanding of the properties which control the coefficient of traction of a fluid has not as yet been achieved, certain basic phenomena have been recognized in the region where two fluid-coated roller surfaces traveling on one another come nearest to touching. When the rollers are stationary and under load, these surfaces are substantially in contact over a small, essentially planar area determined by the geometries and elastic moduli of the rollers. The dimensions of this area and the pressure distribution existing therein can be calculated from these parameters by the well-known equations of Hertz, and the area is generally known as the Hertzian region.

When the rollers are rotating and under load, this motion draws fluid through this region which, as shown by optical, X-ray, and capacitance measurements, causes the surfaces to become separated by a thin, wedge-shaped layer of fluid tapering toward the trailing edge of the contact area and having an average thickness generally exceeding the sum of the heights of the surface asperities of the rollers. The thickness of this layer and the pressure and temperature distribution therein can be approximated for cylindrical rollers by recently developed computational techniques.

The tractive fluid passes through the Hertzian region in an extremely short time and is subjected therein to extremely high pressures, which are determined by the elastic deformation of the rollers, and which cause the viscosity of the fluid to increase greatly. Further, because of the extreme thinness of the liquid layer, even slight slippage between the rollers results in high rates of shear being developed in the liquid. The suddenness with which a fluid becomes compressed with the Hertzian region, the high pressures and viscosities found there, and the high rates of shear all point up the desirability of considering the rheology of such fluids, when trying to assess their tractive properties. Success in clearly relating rheological properties to tractive behavior has thus far, however, been meager, and no theory has yet been proposed which can be usefully applied to the design of fluids with improved coefficients of traction.

In view of the scope of the previous effort, both empirical and theoretical, which has been devoted without success to improving the tractive capacity of fluids to be used in tractive drives, the present invention has contributed remarkable advancements over the prior art through the discovery of fluids having outstanding tractive properties. These fluids are herein called tractants. Because of their increased coefficients of traction, the tractants of the present invention serve to counteract a major disadvantage of contemporary tractive drives, viz., limited torque capacity. With the availability of tractants, certain economic benefits also accrue. For example, the physical size of the load carrying members of an existing tractive drive unit can be reduced as a result of tractants, while still maintaining the same torque capacity and life of parts. Conversely, by maintaining the same physical size and utilizing tractants, greater torque capacity is made available without diminishing the life of the working parts. If the unit size is kept the same and the torque load is not elevated, the utilization of tractants serves to prolong the life of parts because the normal load becomes less.

The magnitude of economic benefits attainable through use of the present invention can be readily illustrated. For example, test data will be hereinafter presented to show that some of these tractants have coefficients of traction almost 30% greater than that of the best tractive fluids of the prior art. Generally speaking, a 30% increase in coefficient of traction of a fluid allows approximately a 30% decrease in the size of the tractive device in which it is employed, while maintaining the same performance. Such a size reduction affords a substantial manufacturing cost savings on metal requirements alone; and handling of the tractive device is simplified by the reduced weight and the diminished space requirements. Tractive drives employing tractants, therefore, can now be used in applications where they were heretofore excluded by reasons of cost, bulk, or weight.

It is an object of the present invention, therefore, to provide certain fluids which have been found to be superior for tractive drives.

Another object of this invention is to provide certain classes of fluids having coefficients of traction substantially higher than that of fluids presently available for tractive drives.

Still another object of the present invention is to provide tractive drives of increased torque capacity through the use of tractants.

Yet another object of the present invention is to permit reduction in size of existing tractive drives through the use of tractants.

Other objects and advantages will become apparent from a consideration of the accompanying disclosure and the appended claims.

It has now been found that organic compounds having certain structural units or elements present within their molecules are superior materials for use in tractive devices as described above. Thus, the materials of this invention, which are described herein as tractants, are those organic compounds (1) Having from about 12 to about 70 carbon atoms, up to eight of which can be replaced by atoms other than carbon atoms and can be selected from such atoms as oxygen, nitrogen, phosphorus, and silicon, and (2) Containing
    (a) at least 1 saturated carbon atom-containing ring having at least 6 member atoms, or
    (b) an acyclic structure in which there are at least 3 quaternary carbon atoms, and (3) Having a coefficient of traction of at least 0.06, as measured by the thrust bearing test machine to be hereinafter described.

Thus, a remarkable achievement of the present invention is the identification of certain structural features, within the extremely broad category of carbon compounds, which lead to fluids having outstanding tractive properties, these fluids being known as tractants. Exemplary tractants of the present invention exhibiting high coefficients of traction are cyclododecane, bicyclohexyl, 1,2-tercyclohexyl, dicyclohexylmethane, and 2,3-dicyclohexyl-2,3-dimethylbutane.

Thus, it has been discovered that the carbon skeleton is of prime importance, whereas functionality and linkage, on the other hand, are not such important factors. For example, by replacing the single bonds linking the cyclohexyl groups in 1,3-tercyclohexyl with ether groups, methylene groups, or ester groups, the coefficient of traction is not substantially reduced. This is merely one illustration that carbon-containing rings having at least six member atoms, such as the cyclohexyl compounds to be hereinafter described, as well as larger carbon-containing rings, contribute to superior tractive properties as compared to that of the acyclic esters and ethers reported in the literature. It also follows that ketones with the same skeletal contributors will exhibit good tractive properties. An example is dicyclohexylketone.

Tractants of this invention containing at least one saturated carbon-containing ring having at least 6 member atoms, 2(a) above, include the cycloalkanes, for example, cyclododecane, as well as the higher homologs thereof and the saturated heterocyclics such as dioxacyclododecane; the hydrocarbon-substituted cycloalkanes, for example, alkyl-substituted cycloalkanes in which the alkyl group can be a normal or a branched alkyl radical or a cycloalkyl radical which can also be substituted with a normal and/or branched chain alkyl radical or another cycloalkyl radical, and also cycloalkyl-substituted normal or branched alkyls. Typical examples of the substituents which can be present (so long as the total atom requirement and coefficient of traction requirement are satisfied) include aliphatic radicals, for example, alkyl radicals, e.g., methyl, ethyl, n-propyl, isopropyl, n-butyl, sec-butyl, isobutyl, tert - butyl, sec - amyl, isoamyl, tert - amyl; hexyl radicals, e.g., 2,2-dimethyl-3-butyl, 2,2-dimethyl-4-butyl, 2,3-dimethyl-2-butyl; heptyl radicals, e.g., 2,2,3-trimethyl-3-butyl; octyl radicals, e.g., diisobutyl; nonyl radicals; decyl radicals; dodecyl radicals; tetradecyl radicals; hexadecyl radicals; octadecyl radicals; and other branched alkyl radicals having the formula $C_nH_{2n+1}$; alkenyl radicals, e.g., propenyl radicals, e.g., allyl, isopropenyl; butenyl radicals, e.g., n-butenyl-1, n-butenyl-2, n-butenyl-3, isobutenyl; pentenyl radicals; hexenyl radicals, e.g., 4,4-dimethylbutenyl-2, 3,4-dimethylbutenyl-1; heptenyl radicals; octenyl radicals, e.g., diisobutenyl; nonenyl radicals; decenyl radicals; dodecenyl radicals, e.g., triisobutenyl and other branched alkenyl radicals having the formula $C_nH_{2n-1}$; cycloaliphatic radicals, for example, cycloalkyl radicals, e.g., cyclopentyl, alkylated-cyclopentyl, cyclohexyl and alkylated-cyclohexyl radicals, e.g., mono- and polymethylcyclopentyl radicals, mono- and polymethylcyclohexyl radicals, mono- and polyethylcyclohexyl radicals, mono- and polyisopropylcyclohexyl radicals, mono- and poly - tert - amylcyclohexyl radicals, diisobutylcyclohexyl (i.e., tert-octylcyclohexyl) radicals, nonylcyclohexyl radicals; cycloalkenyl radicals, e.g., cyclopentenyl, alkylated cyclopentenyl, cyclohexenyl and alkylated cyclohexenyl radicals, e.g., mono- and polymethylcyclopentenyl radicals, mono- and polymethylcyclohexenyl radicals, mono- and polyethylcyclohexenyl radicals, mono- and polyisopropylcyclohexenyl radicals, diisobutylcyclohexenyl radicals, nonylcyclohexenyl radicals; cycloalkyl-substituted aliphatic radicals, for example, phenyl, alkylphenyl, phenylalkyl and alkylphenylalkyl radicals, e.g., tolyl, phenylethyl, isopropylphenyl, cumyl, benzyl, dimethylbenzyl; cyclohexyl- and alkylcyclohexyl-substituted alkyl radicals, e.g., cyclohexylethyl, methylcyclohexylethyl, ethylcyclohexylethyl, cyclohexylpropyl, tert-butylcyclohexylbutyl.

Additionally, the tractants can be oxygen-containing substituted cycloalkanes in which the oxygen-containing substituents can be, for example, alkoxy, alkoxyalkyl, cycloalkoxy, cycloalkoxyalkoxy, alkoxycycloalkyl, cycloalkoxycycloalkyl, alkenoxy, cycloalkoxyalkenyl and alkeneoxyalkenyl as well as alkenoxyalkyl. Illustrative examples of the substituents in such materials include oxygen-containing aliphatic radicals, e.g., alkoxy-substituted alkyl radicals, e.g., propoxyethyl radicals, e.g., n-propoxyethyl, isopropoxyethyl;
butoxyethyl radicals, e.g., n-butoxyethyl, isobutoxyethyl, tert-butoxyethyl;
octoxyethyl radicals, e.g., diisobutoxyethyl;
dibutoxypropyl radicals, e.g., 2,3-di-n-butoxypropyl, 3,3-diisobutoxypropyl;
dioctoxypropyl radicals, e.g., 2,3-bis(diisobutoxy)propyl;
cycloalkoxy-substituted alkyl radicals, e.g., cyclohexoxymethyl, cyclohexoxyethyl radicals, e.g., $\beta$-cyclohexoxyethyl, $\alpha$-cyclohexoxyethyl;
cyclohexoxybutyl radicals, e.g., 2-(cyclohexoxy)butyl, 2,3-dicyclohexoxybutyl;
methylcyclohexoxypropyl radicals, e.g., 2-(2-methylcyclohexoxy)propyl, 2-(4-methylcyclohexoxy)propyl;
butylcyclohexoxyethyl radicals, e.g., $\beta$-(4-tert-butylcyclohexoxy)ethyl, $\alpha$-(2-sec-butylcyclohexoxy)ethyl;
cyclopentoxyethyl radicals, e.g., $\beta$-cyclopentoxyethyl, $\alpha$-cyclopentoxyethyl;
propylcyclopentoxymethyl radicals, e.g., isopropyl cyclopentoxymethyl radicals, n-propyl cyclopentoxymethyl radicals;
alkenoxy-substituted alkyl radicals, e.g., propenoxyethyl radicals, e.g., allyloxy ethyl, isopropenoxy ethyl;
octenoxy ethyl radicals, e.g., diisobutenoxyethyl;
dioctenoxypropyl radicals, e.g., 2,3-bis(diisobutenoxy)propyl;
oxygen-containing cycloaliphatic radicals, e.g., alkoxy-, alkenoxy- and aroxy-substituted cycloalkyl radicals, e.g., alkoxy-substituted cyclopentyl radicals, e.g., mono- and polyethoxycyclopentyl, octoxycyclopentyl radicals, e.g., diisobutoxycyclopentyl; alkoxy-substituted cyclohexyl radicals;

e.g., mono- and polymethoxycyclohexyl, octoxycyclohexyl radicals, e.g., diisobutoxycyclohexyl;

alkenoxy-substituted cyclopentyl radicals, e.g., propenoxycyclopentyl radicals, e.g., isopropenoxycyclopentyl; alkenoxy-substituted cyclohexyl radicals, e.g., vinyloxycyclohexyl, propenoxycyclohexyl radicals, e.g., isopropenoxycyclohexyl; octenoxycyclohexyl radicals, e.g., diisobutenoxycyclohexyl; aroxy-substituted cyclopentyl radicals, e.g., phenoxycyclopentyl and toloxycyclopentyl; aroxy-substituted cyclohexyl radicals, e.g., phenoxycyclohexyl and toloxycyclohexyl; propylphenoxy-cyclohexyl radicals, e.g., isopropylphenoxycyclohexyl radicals; carboalkoxyalkyl radicals

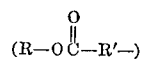

e.g., carbomethoxymethyl,

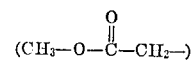

carboethoxyethyl; carboalkoxycycloalkyl radicals, e.g., carboethoxycyclopentyl.

Elements other than or in addition to oxygen can be present such as alkyl radicals containing silicon, e.g.,

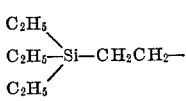

cycloalkyl radicals containing silicon, e.g.,

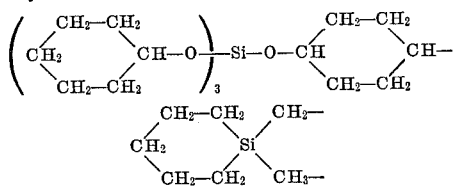

The tractants of this invention having at least one saturated carbon-containing ring having at least 6 member atoms and meeting the other requirements set out above can also be esters, such as any esters of mono- or polycarboxy substituted cycloalkanes and mono- and polyalcohols or conversely mono- or polyhydroxy-substituted cycloalkanes and mono- and polycarboxy organic acids. Illustrative examples of such tractants include compounds of the structures

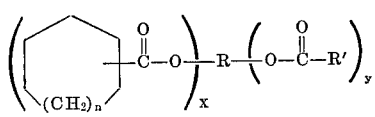

and

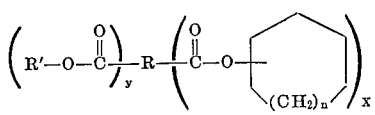

where $n$ and $x$ are whole numbers of at least 1, $y$ is 0 or a whole number, R' is any monovalent radical hereinbefore discussed, and R is a radical having a valence equal to the sum of $x$ and $y$ and having the carbon skeleton of any of the aforementioned radicals. It is to be understood that the carbon-containing rings in the above structures can contain any of of the previously described substituents in addition to the ester or carboxy function. Also included are complex esters of hydroxy acids. In any case, the requirements of total carbon atom content and coefficient of traction must still be satisfied.

Furthermore, tractants of this inventinon can be oligomers of saturated, carbon-containing rings, for example, oligomers in which two or more carbocyclic groups are joined together by a single bond or by a linking radical such as an oxygen atom, an alkyl-substituted nitrogen atom, an alkyl-substituted phosphorus atom, a dialkyl-substituted silicon atom, a methylene group, a carbonyl group, a carboxy group, or a dialkylsiloxy group. Such polymers may have the structure

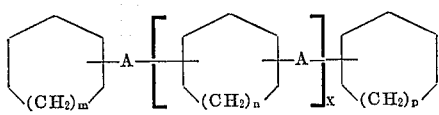

in which $m$, $n$ and $p$ are cardinal numbers but at least one of $m$, $n$ and $p$ is 1, $x$ is zero of a whole number, and A is the linking radical. Of course, any or all of the rings can contain any of the various substituents heretofore described.

In addition, the tractants of this invention can be tertiary amines in which there is at least one cycloalkyl radical having at least 6 carbon atoms in the ring portion thereof, for example, those amines of the structure

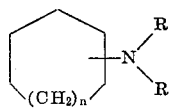

where $n$ is a cardinal number of at least one and each R can be any substituent which, together with the remainder of such amines, satisfies the requirements previously set forth. Typically, each R can be selected from any of the substituents heretofore described. Also, the R's together with the nitrogen atom can form a heterocyclic ring.

In addition to the above, the tractants of this invention can be those organic compounds having an acyclic structure in which there are at least 3 quaternary carbon atoms, as stated in 2(b) above, each quaternary carbon atom having the following general formula

where the R's may be any of the various monovalent substituents and radical hereinbefore enumerated or any polyvalent radical having the carbon skeleton of any of those substituents and radicals; and where the R's may contain, in addition to carbon and hydrogen, other atoms such as oxygen, nitrogen, phosphorus, etc. It is to be understood that the monovalent and polyvalent radicals are so chosen as to form a neutral moluecule. For example, in the following compound

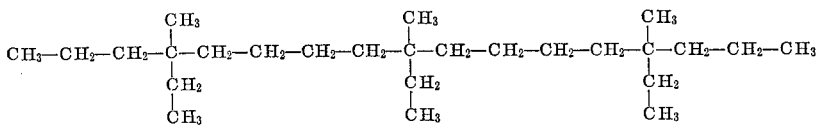

the three monovalent radicals for each of the first and third quaternary carbons are ethyl, methyl and propyl while the single divalent radical is ethylene. The two radicals for the second quaternary carbon are ethyl and methyl while the two divalent radicals are both ethylene.

The tractants of this invention having an acyclic structure in which there are at least 3 quaternary carbon atoms and meeting the other requirements set out above can, in addition to the class of hydrocarbons exemplified above, also be members of other classes such as esters, e.g., neopentyl glycol 2,2-dimethylbutyrate, ethers, e.g., 2,2-bis(3, 3-dimethylpentoxymethyl)propane, amines, e.g., tris(2,2-dimethylhexyl)amine, silicates, e.g., tetrakis(2,2-dimethylbutyl)orthosilicates, etc.

Also included within the scope of the present invention are tractants comprising mixtures of any two or more of the compounds hereinbefore described, or mixtures of any one one of these compounds with compounds outside the scope of the present invention, provided the resulting coefficient of traction is at least about 0.06.

Also, it has been found desirable to use viscosity index (VI) improvers with some of the tractants and mixtures of tractants in order to meet the temperature-viscosity requirements for certain tractive drive uses. It is to be understood that materials other than VI improvers in minor amounts, such as antioxidants, rust inhibitors, seal swellers, antifoam additives, antiwear additives, anticorrosion additives, dispersants, dyes, and other useful substances can also be incorporated in the tractants.

To compare the tractive properties of various fluids, it is necessary to provide a standard of measurement. Numerous methods and techniques have been devised for measuring the coefficient of traction where a fluid film separates rolling contact surfaces. Since these techniques differ with respect to principle of operation and method of measurement, ideal correlation in relative or absolute magnitude of the data is not obtainable throughout. Consistent results, however, have been demonstrated with certain types of test machines, and these have been successfully employed for comparative evaluations.

The technical literature includes a description of one test machine which utilizes thrust-loaded ball bearings in determining coefficient of traction. See "Effect of Lubricant Composition on Friction as Measured With Thrust Ball Bearings" by F. G. Rounds [J. Chem. and Eng. Data, vol. 5, No. 4 pp. 499 (1960)]. This machine measures the torque transmitted from a central drive shaft to a torque arm through two thrust ball bearings which are submerged in the test fluid. The bearings are shaft-mounted and can be rotated while being subjected to an axial thrust load. Thrust loads are applied hydraulically or by compressing calibrated Belleville springs. A tachometer geared to the drive shaft measures the rotational speed. Thermocouples located within ⅛-inch of the balls of the test bearings measure the test fluid temperature which is held constant at various predetermined temperatures by heating or cooling the jacket fluid in the housing surrounding the test chamber.

The individual balls tends to spin on an axis parallel to the principal bearing axis as well as roll around the raceway. As a result, both rolling and sliding actions contribute to the traction. The output torque is measured with the torque arm which is fitted between the two bearings. This measured torque is then interpreted in terms of coefficient of traction for the tractant being evaluated. The coefficients obtained from this test machine are relatable to those measured in actual tractive drives. Hence, the machine is effective for screening candidate fluids.

The procedure for evaluating the tractive properties of a fluid on the above machine consists of breaking in a new set of ball bearings in the test fluid and then measuring the torque transmitted through the bearings as a function of load, speed and fluid temperature. To eliminate the possibility of carry-over from one fluid to the next, a new set of bearings is used for each test. During break-in, the machine is operated at the test loads and temperatures until stabilized traction values are obtained, which requires from several minutes to several hours, depending on the test fluids.

When coefficients of traction are quoted in the description of the present invention and in the claims appended thereto, it is to be understood that, except where otherwise indicated, these coefficients are based upon the thrust bearing test machine method of measurement referred to above, and at the test conditions of Table I, infra. Studies of data repeatability with this machine using hydraulic loading means have shown that, for the same test fluid at given test conditions, the standard deviation of each measured coefficient of traction is generally less than 3% of its value.

To corroborate the traction data presented in Table I, infra, most of the compounds enumerated therein were also tested on a rolling disc machine, a device to be described hereinafter in detail. In general, satisfactory correlation was obtained between the thrust bearing traction values and the rolling disc traction values.

In the technical paper on the thrust bearing machine, cited supra, test results were presented on mineral oils, synthetic oils, and mineral oils containing additives. The synthetic fluids tested included fatty acids, alcohols, esters, silicones, and halogenated compounds such as chlorinated biphenyl. Among the additives were acids and alcohols, sulfur and chlorine compounds, nitrogen compounds, phosphorus compounds, and metal organic compounds. It was shown that both the base oil and the type of additive have a pronounced effect on traction. Naphthenic based oils, for example, gave higher traction values than paraffinic based oils.

In general, the coefficient of traction decreases as oil temperature, ball velocity, or load increases, according to results obtained from the thrust bearing test machine. For a meaningful comparison of various fluids with respect to tractive properties, therefore, standard test conditions must be applied. Data presented in the paper cited above were taken at a fluid temperature of 200° F. and under an average Hertz stress of 400,000 p.s.i. The term "Hertz stress" refers to the nominal compressive stress in the load zone. Linear ball velocity was varied from 0 to 600 feet per minute. Using the results obtained at 600 feet per minute, the coefficients of traction measured on the thrust bearing machine were in the broad range of 0.004 to 0.061 for all the fluids explored therein. No coefficient in excess of 0.061 was demonstrated. The maximum coefficient of 0.061 was obtained using a trifluorochloroethylene polymer. Another synthetic lubricant, a fluoroalkyl camphorate, displayed a coefficient of tration of 0.058. The coefficients of other synthetic lubricants, such as silicones and diesters, fell approximately within the mineral oil range of 0.035 to 0.055. While these data show that the coefficient of traction varies widely with fluid structure, they are too limited to define which sructural units lead to high coefficients.

The outstanding tractive properties of tractants were demonstrated on the thrust bearing test machine hereinbefore described. Except for ball velocity, test conditions were the same as in the technical paper cited above. Tractant temperature was maintained at 200° F., the Hertz stress was 400,000 p.s.i., and the linear ball velocity was 750 feet per minute. The slightly higher velocity employed under the present test conditions reduces the apparent improvement over the prior art fluids because coefficient of traction diminishes with increasing velocity.

The following table presents coefficient of traction data for a number of tractants. Test conditions were as recited above. The percentage improvement over the maximum nominal prior art coefficient of 0.060, as measured by the thrust bearing machine, is also shown. This table is intended to be illustrative only, and does not include all of the compounds or classes taught by the present invention.

TABLE I

| Tractant | Coefficient of traction | Percent increase over 0.060 |
| --- | --- | --- |
| Isodecylcyclohexane | 0.066 | 10 |
| Isopentadecylcyclohexane | 0.061 | 2 |
| Cyclododecane | 0.075 | 25 |
| Bicyclohexyl | 0.074 | 23 |
| 4-(1-methylethyl) bicyclohexyl | 0.069 | 15 |
| 4,4'-bis(1-methylethyl)bicyclohexyl | 0.064 | 7 |
| x-Isohexyl-4'-isopropylbicyclohexyl | 0.062 | 3 |
| x-Cyclopentylbicyclohexyl | 0.061 | 2 |
| Dicyclohexylmethane | 0.072 | 20 |
| (x-Ethylcyclohexyl)cyclohexylmethane | 0.071 | 18 |
| [x-Cyclohexyl(1-methylethyl)] cyclohexylmethane | 0.065 | 9 |
| Bis(2,4,6-trimethylcyclohexyl)-methane | 0.061 | 2 |
| 1,1-dicyclohexylethane | 0.076 | 27 |
| 1,1,3-trichlorohexylpropane | 0.068 | 14 |
| Trimethylolpropane tricyclohexanecarboxylate | 0.067 | 12 |
| 1,2-tercyclohexyl | 0.073 | 21 |
| 1,3-tercyclohexyl | 0.070 | 17 |
| x-(1,1-dimethylbutyl)1,3-tercyclohexyl | 0.064 | 7 |
| x-(1,1-dimethylbutyl)1,2-tercyclohexyl | 0.070 | 16 |
| 1,2-isopropyltercyclohexyl | 0.067 | 11 |
| 1,3-isopropyltercyclohexyl | 0.065 | 91 |
| Bis(1,3-cyclohexyloxy)-cyclohexane | 0.074 | 23 |
| 1,x-bis(methylcyclohexyl)-cyclohexane | 0.067 | 12 |
| Dicyclohexyl cyclohexane-1,3-dicarboxylate | 0.065 | 9 |
| x,x'-Quatercyclohexyl | 0.070 | 17 |
| 6-ethyl-2,2,4,4,11,11,13,13-octamethyltetradecane and 2,2,4,4,13,13,15,15-actamethylhexadecane | 0.062 | 3 |
| Tricyclohexylmethane | 0.073 | 21 |
| N-cyclohexylpiperidine | 0.068 | 14 |
| n-Isopropyltricyclohexyl | 0.071 | 18 |
| Neopentyl glycol dineotridecanoate | 0.061 | 2 |
| Bicyclooctyl | 0.065 | 9 |
| Bicyclododecyl | 0.064 | 7 |
| Cyclohexylcyclododecane | 0.070 | 17 |
| Cycloheptylcycolhexane carboxylate | 0.062 | 3 |
| Cyclooctylcyclohexane-carboxylate | 0.067 | 12 |
| Cyclododecylcyclohexane-carboxylate | 0.070 | 17 |
| Bis cis and trans 1,2-cyclohexyl-cyclohexane-dicarboxylate | 0.065 | 9 |

TABLE 1—Continued

| Tractant | Coefficient of traction | Percent increase over 0.060 |
|---|---|---|
| 1,1-dicyclohexyl-2-methylpropane | 0.071 | 18 |
| 1,1-dicyclohexyl-2-methylbutane | 0.065 | 9 |
| 1,1-dicyclohexyl-2,5-dimethylhexane | 0.067 | 12 |
| 1,1-dicyclohexylpentane | 0.066 | 10 |
| 1,2-dicyclohexylpropane | 0.073 | 21 |
| 1,2-di(x-ethylcyclohexyl)propane | 0.067 | 12 |
| 2,2-dicyclohexylpropane | 0.065 | 9 |
| 2,3-dicyclohexyl,2,3-dimethylbutane | 0.067 | 12 |
| 1,3-dicyclohexyl,2-methylbutane | 0.062 | 3 |
| 1,3-dicyclohexylbutane | 0.067 | 12 |
| 1,2,3-tricyclohexylpropane | 0.074 | 23 |
| Cyclopentamethylene dicyclohexylsilane | 0.063 | 5 |

From the data of Table I it is evident that tractants offer substantial increases over the coefficient of 0.060 for the prior art fluids. Thus, it is now possible to significantly increase the torque capacity of tractive drives by employing tractants such as those enumerated above.

To demonstrate the outstanding properties of tractants in a test machine in which the size of the tractive elements and the amount of torque transmitted by these elements approximate those of a practical devise, four trantants selected from the list in Table I were compared with three leading commercial tractive drive fluids in a rolling disc machine. This machine, which was designed to prodict the performance of a fluid in variable speed gears, comprises two hardened steel rollers which may be loaded one against the other and driven at any required speed. The fluid is introduced between the rollers and the relationships between applied load, roller surface speeds, relative sliding speed between the two rollers, and torque transmitted from one roller to the other through the contact between them, are a measure of the potential performance of the fluid in a variable speed gear. Literature references on this rolling disc machine include M. A. Plint [Proceedings of the Inst. of Mech. Engrs., vol. 180, pp. 225, 313 (1965–66)]; "The Lubrication of Rollers, I" by A. W. Crook [Phil. Trans. A 250, 387 (1958)]; and "The Lubrication of Rollers, IV, Measurements of Friction and Effective Viscosity" by A. W. Crook [Phil. Trans. A 255, 281 (1963a)].

The two test rollers of 1% chromium ball bearing steel, are carried at the ends of shafts running in heavy duty ball and roller bearings. The rollers, which are hardened to 62 to 65 Rockwell C, have a diameter of 6 in. and are crowned to a radius of 3 in. to give a circular contact zone. The rollers are loaded together by dead weights acting through levers of 10:1 ratio, the upper roller bearings being carried in a sliding housing. The roller shafts are connected by flexible couplings to a spur gearbox having interchangeable pick-off gears. By changing the gear ratio, tangential slip may be introduced between the roller surfaces and power may be transmitted from one to the other. The lower shaft of the gearbox is driven by an electric motor by way of a toothed belt, the motor being mounted on trunnions to permit measurement of the input torque to the machine. The gearbox is also mounted on trunnions and the torque reaction of the gearbox, measured by an arm and a spring balance, is related to the torque transmitted between the rollers. A dashpot, required for certain tests exhibiting marked instability, may be connected to the gearbox torque arm. The rollers are enclosed in a polymethyl methacrylate casing and the oil sample under examination, amounting to about 100 cc., is contained in the casing, the lower roller dipping into it. Roller surface temperature is indicated by a Chromel-Alumel thermocouple carried on the end of a leaf spring and bearing lightly against the rim of the lower roller, while a further thermocouple indicates the temperature of the oil sample in the casing.

The driving speed and gear ratio are selected to give the required rolling and sliding speeds and the machine is run for 6 to 8 minutes with a load applied to the rollers of about ⅙ of the full test load; this insures that the bearings are warmed up and that parasitic losses reach a steady value. Readings of the various torques and temperatures are then taken with all load removed from the rollers and at five different loads between minimum and maximum, and finally a recheck is taken of torques with all load removed from the rollers.

Above a certain minimum speed the coefficient of traction is a function of the sliding velocity, e.g., the difference in velocities of the two roller surfaces, and is essentially independent of load and the mean velocity of the roller surfaces. In a practical variable speed transmission, the rates of sliding that are of significance in the transmission of power usually range from approximately 1 in./sec. up to 50 in./sec. For comparative purposes, therefore, the best criterion of the tractive capacity of a fluid is the average value of the coefficient of traction over this said range of sliding.

The average value of the coefficient of traction in the rolling disc machine is obtained by statistical techniques from the coefficient of traction values of a fluid over a range of loads, mean surface velocities and sliding velocities.

The three leading tractive drive fluids used in the rolling disc test for comparison with tractants are identified as Fluid "A," Fluid "B" and Fluid "C." Fluid A" is a synthetic paraffinic hydrocarbon with a viscosity of 45 cs. at 100° F. and 6.7 cs. at 210° F. Fluid "B" is a naphthenic-based oil with a viscosity of 47 cs. at 100° F. and 6.6 cs. at 210° F. Fluid "C" is a mineral oil with similar viscosity characteristics. The tractants are identified as Fluid "D," Fluid "E," Fluid "F" and Fluid "G." Fluid "D" is a 70:30% by volume mixture of 1,2- and 1,3-tercyclohexyl; Fluid "E" is a mixture of 6-ethyl-2,2,4,4,11,11,13, 13 - octamethyltetradecane and 2,2,4,4,13,13,15,15-octamethylhexadecane. Fluid "F" is a mixture of isomers of isopropylbicyclohexyl, and Fluid "G" is neopentyl glycol dineotridecanoate.

Table II below presents the results of this comparative test wherein the superiority of the tractants of the present invention is readily apparent. All data are referred to a fluid temperature of 160° F. and a Hertz stress of 224,000 p.s.i. The coefficient of traction is the average coefficient over a range of sliding speed of from 1 in./sec. to 50 in./sec., and mean surface velocities of from 770 ft./min. to 4,640 ft./min.

TABLE II.—ROLLING DISC TEST RESULTS

| | Average Coefficient of Traction at 160° F. | Percent Increase Over Fluid "A" |
|---|---|---|
| Fluid A | .069 | |
| Fluid B | .054 | −22 |
| Fluid C | .065 | −6 |
| Fluid D | .106 | +54 |
| Fluid E | .083 | +20 |
| Fluid F | .082 | +19 |
| Fluid G | .079 | +14 |

To demonstrate an improved coefficient of traction in a representative mechanical device, the tractant identified hereinbefore as Fluid "D" was tested in a double toroidal variable drive designed for use in automatic automotive transmissions. A dynamometer test stand adapted to measure coefficient of traction was employed for this test. For comparison, the two leading commercial tractive drive fluids identified hereinbefore as Fluid "A" and Fluid "B" were evaluated under identical test conditions.

Table III below represents the results of this comparative test wherein the superiority of the tercyclohexyl tractant of the present invention is readily apparent. All data were taken at 200° F. tractant or fluid temperature

EXAMPLE 3

Bicyclohexyl.—Commercially obtained biphenyl of 99.9% purity was reduced at 120° C. and 1500 p.s.i.g. to yield bicyclohexyl. The viscosity of this tractant, as meas-

TABLE III.—DYNAMOMETER TEST RESULTS COEFFICIENT OF TRACTION AT 200° F.

|  | 200,000 p.s.i. Hertz Stress | | | | | 400,000 p.s.i. Hertz Stress | | | | |
| --- | --- | --- | --- | --- | --- | --- | --- | --- | --- | --- |
|  | 500 ft./min. | 1,000 ft./min. | 2,000 ft./min. | 3,000 ft./min. | 4,000 ft./min. | 500 ft./min. | 1,000 ft./min. | 2,000 ft./min. | 3,000 ft./min. | 4,000 ft./min. |
| Fluid A | .057 | .056 | .054 | .050 | .045 | .057 | .051 | .040 | .033 | .028 |
| Fluid B | .053 | .048 | .044 | .041 | .039 | .056 | .051 | .046 | .041 | .037 |
| Fluid D [1] | .083 | .081 | .075 | .070 | .066 | .064 | .061 | .053 | .044 | .042 |

[1] Mixture of 1,2- and 1,3-tercyclohexyl.

and the rolling velocity was varied from 500 to 4000 ft./min. at Hertz stresses of 200,000 and 400,000 p.s.i.

The following examples describe in detail the method of preparing some representative tractants. In general, the tractants of this invention can be prepared by standard organic synthesis methods known to those skilled in the art. For example, many of the tractants disclosed in this invention were prepared by catalytic reduction of an appropriate aromatic or olefinic intermediate. While some of these intermediates can be isolated from coal tar or petroleum, others were prepared by such reactions as acid-catalyzed alkylation of an appropriate aromatic substrate with an olefin, free radical coupling of benzylic compounds, esterification of appropriate aromatic acids and alcohols, and by copper catalyzed coupling of phenoxides and aryl halides. Other tractants were prepared by methods involving Grignard reactions as, for example, the coupling of allylic halides. Still others can be prepared by catalytic oligomerization of appropriate olefins.

EXAMPLE 1

Cyclopentylbicyclohexyl.—A mixture consisting of 2504 g. (11.3 moles) of cyclopentylbiphenyl, 251 g. of 65% nickel-on-kieselguhr catalyst, and 3100 ml. of n-hexane was charged into a 3-gallon stirred autoclave. Reduction began at 130° C. and an initial hydrogen pressure of 1600 p.s.i.g. Hydrogen absorption was quantitative. The catalyst was removed by filtering, and the solvent was removed by distillation. The product was distilled at reduced pressure through a 3 by 90 cm. packed column, B.P. 116.5° C. (0.6 mm.), 126° C. (0.95 mm.), $n_D^{20}=1.4977$; $d_4^{20}$ 0.9260.

Analysis.—Calc'd. for $C_{17}H_{30}$: C, 87.1%; H, 12.9%. Found: C, 86.7%; H, 13.2%.

The viscosity of this tractant, as measured per ASTM method D445–61, was 14.42 cs. at 100° F. and 3.03 cs. at 210° F. The coefficient of traction was 0.061, as measured with the thrust bearing test machine.

EXAMPLE 2 p-Tercyclohexyl.—A 300-ml. rocker-type autoclave was charged with 100 g. (0.435 mole) of p-terphenyl, 20 ml. of methanol, and 6 g. of 62.5% nickel-on-kieselguhr catalyst. Under an initial pressure of 120 atmospheres of hydrogen at 215° C., the uptake of hydrogen corresponded to one-third of the amount theoretically required for complete reduction.

The autoclave contents were taken up in petroleum ether, the catalyst removed by filtration, and the solvent removed by evaporation. The autoclave was recharged with 56 g. of the partially reduced material and 6 g. of catalyst. The reduction was continued under an initial hydrogen pressure of 160 atmospheres at 220–250° C. until hydrogen uptake ceased. The reduction mixture was taken up in petroleum ether, the catalyst removed by filtration, and the solvent removed by evaporation. Distillation yielded a white solid, B.P. 150° C./0.08 mm., M.P. 152–153° C.

The coefficient of traction was approximately 0.072 in a 50/50 mixture with o-tercyclohexyl, since p-tercyclohexyl is a solid, melting predominantly at 152–153° C. at test conditions.

ured per ASTM method D445–61, was 3.04 cs. at 100° F. and 1.22 cs. at 210° F. The coefficient of traction was 0.074, as measured with the thrust bearing test machine.

EXAMPLE 4

Bis(1,3-cyclohexyloxy)cyclohexane.—306 g. 1.17 moles of m-di-phenoxybenzene, 10 g. of rhodium on carbon, and 600 ml. of methylcyclohexane were charged to a 2-liter autoclave, flushed three times, pressurized to 1200 p.s.i. and tested for leaks. The material was heated to 50° C., 1500 p.s.i., where exothermic hydrogenation set in. The rate of hydrogenation was controlled by feed-ins from drops to 900 p.s.i. to increases of 1500 p.s.i. The temperature increased to 100° C. in 20 minutes, after which gradual feed-ins of hydrogen appeared to be less consumed. The reaction mixture was finally heated to 150° C., 3000 p.s.i., and finished off at these conditions for 3 hours. The cooled reaction mixture was filtered, excess solvent removed in vacuo, and the concentrates distilled under vacuum, B.P. 150° C./0.05 mm. Material filtered through alumina to remove traces of alcohols, purity >99.5% via vpc.

The viscosity of this tractant, as measured per ASTM method D445–61, was 35.72 cs. at 100° F. and 4.60 cs. at 210° F. The coefficient of traction was 0.074, as measured with the thrust bearing test machine.

EXAMPLE 5

2,2,4,4,13,13,15,15-octamethylhexadecane and 6-ethyl-2,2,4,4,11,11,13,13-octamethyltetradecane (a mixture of hydrocarbons). Magnesium turnings (31.9 g.-atom), 125 ml. of dry tetrahydrofuran and 20 g.-atoms of dodecenyl chloride were heated with a crystal of iodine to initiate the reaction. Heat was thereafter removed and the reaction was carried out between 45–50° C. by the rapid dropwise addition of 1500 ml. of tetrahydrofuran containing 510 g. (2.62 moles) of dodecenyl chloride over a 4-hour period. The reaction mixture was refluxed for 28 hours, decomposed with 10% hydrochloric acid and ice, the organic layer separated, washed with a saturated solution of sodium chloride, and dried over anhydrous magnesium sulfate. The tetrahydrofuran was removed in vacuo and the desired mixture of diolefins collected as colorless liquids boiling principally at 120° C./0.03 mm., purity >99.5% via vpc analysis.

The $C_{24}$ diolefin mixture was catalytically reduced at 170° C., 3200 p.s.i. of hydrogen for six hours using methylcyclohexane as a solvent and 10 g. of 5% Rh/C, the reactants filtered and concentrated in vacuo. The desired hydrocarbon mixture boiled principally at 135–140° C./0.03 mm., purity >99.5% via vpc. and exhibited no trace unsaturation by N.M.R. analysis.

The viscosity of this tractant, as measured per ASTM method D445–61, was 26.08 cs. at 100° F. and 4.24 cs. at 210° F. The coefficient of traction was 0.062, as measured with the thrust bearing test machine.

EXAMPLE 6

1,2- 1,3-tercyclohexyl mixture.—Mixed o- and m-terphenyl (7.8 kg, 34 moles), 1 gal. of methylcyclohexane, and 75 g. of rhodium on carbon were charged in a 5 gal. autoclave, pressurized, flushed three times, and heated to 80° C. after testing for leaks at 1200 p.s.i. hydrogen pressure. The mixture hydrogenated rapidly at these temperatures and pressures (100° C., 1500 p.s.i.) and hydrogen was intermittently fed in as the exothermicity of the reaction was controlled in this manner. The reaction was finished off at 3000 p.s.i. and 200° C. for 2 hours after there was no noticeable uptake of hydrogen. The reactants were concentrated in vacuo with mild heating and the concentrates distilled under vacuum, B.P. 120–135° C./0.05 mm., $n_D^{25}$ 1.5018.

The viscosity of this tractant, as measured per ASTM method D445–61, was 33.27 cs. at 100° F. and 4.15 cs. at 210° F. The coefficient of traction was 0.072, as measured with the thrust bearing test machine.

EXAMPLE 7

Tricyclohexylmethane.—200 g. of triphenyl methane, 200 ml. of methylcyclohexane, and 8 g. of 5% rhodium on carbon were charged in a 1-liter autoclave. Hydrogenation started at 50° C., and the reaction was completed at 200° C. and 3000 p.s.i. The autoclave was cooled, the reactants were filtered, and the filtrate was distilled under vacuum, yielding 180 g. of tricyclohexylmethane. Boiling point=155° C. at 5 mm.; melting point=45° C.; $n_D^{50}$=1.5020; spec. gravity=0.9227.

The coefficient of traction was 0.073, as measured by the thrust bearing machine.

EXAMPLE 8

2,3-dicyclohexyl - 2,3 - dimethylbutane.—2,3-diphenyl-2,3-dimethylbutane (378 g., 1.59 moles), 25 g. of 5% rhodium-on-carbon catalyst and 400 ml. of methylcyclohexane were charged to a 1-liter autoclave, flushed three times, pressurized to 1200 p.s.i. and tested for leaks. The material was heated to 60° C., 1400 p.s.i., where exothermic hydrogenation set in. The rate of hydrogenation was controlled by feed-ins from drops to 900 p.s.i. to increases of 2000 p.s.i. Most of the reduction was carried out at 100° C. over a ninety minute period at these pressures. After this treatment, the reactants were heated to 200° C., 3000 p.s.i. for 4 hours to insure complete reduction. The cooled reaction mixture was filtered, excess solvent removed in vacuo and the concentrates distilled under vacuum, B.P. 135°C./0.02 mm. This water-white liquid $n_D^{25}$ 1.5020, was free of any trace of unsaturation as evidenced by N.M.R. analysis and exhibited purity >99.5% by vpc analysis.

The viscosity of this tractant, as measured per ASTM method D445–61, was 32.01 cs. at 100° F. and 4.826 cs. at 210° F. The coefficient of traction was 0.074, as measured in the rolling disc test machine.

2,3-diphenyl-2,3-dimethylbutane (M.P. 117–119° C.) was prepared in 60–70% yield by t-butylperoxide treatment of isopropylbenzene.

EXAMPLE 9

Cyclopentamethylene dicyclohexylsilane. — Commercially purchased cyclopentamethylene diphenylsilane (200 g., 0.79 mole), 20 g. of 5% rhodium-on-carbon and 500 ml. of methylcyclohexane were charged to a 2-liter autoclave and the reactants hydrogenated at 3000 p.s.i. (200° C.) for 6 hours. Conventional work-up of the products and N.M.R. analysis revealed that ca. 85% of the starting material ($n_D^{25}$ 1.5662) had been reduced. Therefore, the reaction products were further reduced under the same reaction conditions using 15 g. of 5% rhodium-on-carbon and the cooled reaction products filtered, concentrated in vacuo and distilled. The desired hydrocarbon, cyclopentamethylene dicyclohexylsilane, was collected as a water-white liquid boiling principally at 135°C./0.05 mm. (200 g., 96% yield). The N.M.R. spectrum of this hydrocarbon ($n_D^{25}$ 1.5088) showed no peaks below −2.0 p.p.m. in $CCl_4$ indicative of complete hydrogenation and the vpc chromatogram showed only one component (purity >99%).

The viscosity of this tractant, as measured per ASTM method D445–61, was 25.48 cs. at 100° F. and 3.857 cs. at 210° F. The coefficient of traction was 0.064, as measured in the rolling disc test.

EXAMPLE 10

Ccyclododecyl cyclohexane carboxylate.—Cyclododecanol (168 g., 1 mole) dissolved in 600 ml. of pyridine was treated with cyclohexanecarbonyl chloride (146 g., 1 mole) over a period of 1 hour at ice bath temperatures (5–10° C). The reactants were allowed to warm to room temperature with stirring and gently refluxed for 1 hour at 60° C. The excess pyridine was removed in vacuo with mild heating (50–60° C.) and the resulting slurry dissolved in excess ether and water. The ether layer was separated, washed with 1-liter of 5% hydrochloric acid, 1-liter of 5% potassium hydroxide and three times with 1-liter of water. The dried ether solutions ($Mg \cdot SO_4$) were concentrated in vacuo and the residues vacuum distilled. The desired ester, cyclododecyl cyclohexanecarboxylate, was collected as a light yellow liquid boiling principally at 135–140° C./0.1 mm., (246 g., 84% yield). Vpc and IR analysis of this ester ($n_D^{25}$ 1.4869 showed no trace contamination by cyclododecanol. Calc'd for $C_{19}H_{34}O_2$: C, 77.49; H, 11.64; mol. wht. 294.5. Found: C, 77.52; H, 11.60; mol. wht. 297.

The viscosity of this tractant, as measured per ASTM method D445–61, was 58.96 cs. at 100° F. and 6.267 cs. at 210° F. The coefficient of traction was 0.070, as measured in the thrust bearing test machine.

EXAMPLE 11

2,2-dicyclohexylpropane. — Commercially obtained 2,2-diphenylpropane (200 g., 1.02 moles), 15 g. of 5% rhodium-on-carbon catalyst and 500 g. of methylcyclohexane were charged to a 2-liter autoclave, flushed three times, pressurized to 1200 p.s.i. and tested for leaks. The hydrogenation occurred immediately at room temperature when the reactants were rocked in the autoclave. The temperature rose to 80° C. in fifteen minutes with a 1700 p.s.i. pressure drop. The reactants were gradually heated to 200° C., 3000 p.s.i. over a ninety minute period after the rapid initial hydrogenation. The mixture was heated and rocked at 200° C., 3000 p.s.i. for two hours after no further uptake of hydrogen occurred (total reaction time was six hours). The cooled reaction mixture was filtered, excess solvent removed in vacuo and the concentrates distilled under vacuum, B.P. 110–115° C./0.05 mm. This water-white liquid was free of any trace of unsaturation as evidenced by NMR analysis and exhibited purity >99.5% by vpc analysis.

The viscosity of this tractant, as measured per ASTM method D445–61, was 9.922 cs. at 100° F. and 2.411 cs. at 210° F. The coefficient of traction was 0.065, as measured in the thrust bearing test.

EXAMPLE 12

1,2,3-tricyclohexylpropane.—1,2,3-triphenyl - 1 - propene (128 g., 0.47 mole), 15 g. of 5% rhodium-on-carbon catalyst and 500 ml. of methylcyclohexane were charged to a 2-liter autoclave, flushed three times, pressurized to 1200 p.s.i. and tested for leaks. The reactants were heated to 65° C., 1500 p.s.i., where exothermic hydrogenation set in. The rate of hydrogenation was controlled by feed-ins from drops to 900 p.s.i. to increases of 1500 p.s.i. Most of the reduction was carried out at 80–95° C. over an hour's period of time at these pressures. After this treatment, the reactants were heated to 200° C., 3000 p.s.i. for 5 hours to insure complete reduction. The cooled reaction mixture was filtered, excess solvent removed in vacuo and the concentrates distilled under vacuum, B.P. 140° C./0.025 mm. This water-white liquid, $n_D^{25}$ 1.4948, was free of any trace of unsaturation as evidenced by NMR analysis and exhibited purity >99% by vpc analysis. The purity of this hydrocarbon was further improved by column chromatography using alumina to remove trace alcohol contaminants and dry heptane as a solvent medium. The water-white pure 1,2,3-tricyclohexylpropane, $n_D^{25}$ 1.4960, showed no trace contaminants upon overloading the vpc column.

*Analysis.*—Calculated for $C_{21}H_{38}$: C, 86.82; H, 13.18; mol. wht. 290.5. Found: C, 86.87; H, 13.14; mol. wht. 299.

The viscosity of this tractant, as measured per ASTM method D445–61, was 278.4 cs. at 100° F. and 7.688 cs. at 210° F. The coefficient of traction was 0.083, as measured in the rolling disc test.

1,2,3-triphenyl-1-propene, B.P. 150° C./0.05 mm., was prepared in 98% yield by iodine catalyzed dehydration of 1,2,3-triphenyl-2-propanol using refluxing toluene to azeotrope off the water formed during dehydration. 1,2,3-triphenyl-2-propanol, B.P. 155° C./0.1 mm., was prepared in 50% yield by the Grignard addition of phenylmagnesium bromide to 1,3-diphenylacetone followed by the conventional hydrolysis and work-up techniques.

EXAMPLE 13

1,2-di(x - ethylcyclohexyl)propane.—Concentrated sulfuric acid (1.56 l., 28 moles) was added to ethylbenzene (2,980 g., 28.1 moles) with stirring and cooling at −10 to 0° C. over a period of one hour. Allyl alcohol (0.595 l., 8.75 moles) was added to this mixture over a period of 2 hours keeping the temperature below 25° C. with cooling. The reactants were stirred for an additional 18 hours, siphoned into a bucket of ice and the water layer separated by blending the emulsion with 5 l. of benzene. The organic layer was washed with water, 10% sodium bicarbonate and water, and the solution concentrated in vacuo. The crude product (ca. 1 l.) was collected by distillation, B.P. 135°/0.2 mm. The crude product was redistilled over 2 g. of sodium and a water white distillate, B.P. 135°/0.2 mm. (744 g., 35% yield, $n_D^{25}$ 1.5460, was collected for reduction. 1,2 - di(x - ethylphenyl)propane (744 g., 2.94 moles), 20 g. of 5% rhodium-on-carbon and 800 ml. of methylcyclohexane were charged to a 3 l. autoclave and hydrogenated at 3500 p.s.i. (200° C.) for 6.5 hours. The cooled reactants were filtered, concentrated in vacuo and the concentrates vacuum distilled. The desired hydrocarbon, 1,2-di(x-ethylcyclohexyl)propane, was collected as a water white liquid boiling principally at 130–140°/0.25 mm. (755 g., 99% yield). NMR analysis of this hydrocarbon mixture ($n_D^{25}$ 1.4812) showed no peaks below −2.0 p.p.m. in $CCl_4$ indicative of complete saturation. Calculated for $C_{19}H_{36}$: C, 86.28; H, 13.72; mol. wht. 264.5. Found: C, 86.32; H, 13.72; mol. wht. 277.

The viscosity of this tractant, as measured per ASTM method D445–61, was 18.55 cs. at 100° F. and 3.172 cs. at 210° F. The coefficient of traction was 0.074, as measured in the rolling disc test.

EXAMPLE 14

Cyclohexylcyclododecane.—The Grignard reagent, phenylmagnesium bromides in 600 ml. of anhydrous ether, was prepared by conventional techniques using 24.3 g. (1 gr.-atom) of magnesium turnings and 157 g. (1 mole) of bromobenzene. Cyclododecanone (145.6 g., 0.8 mole) dissolved in 400 ml. of anhydrous ether was added to this Grignard reagent over a 2.5 hour period with stirring and refluxed gently for 18 hours with stirring. The reaction mixture was hyrolyzed with ice (ca. 2 kg.) and ammonium chloride (ca. 200 g.), the insoluble salts separated by filtration, and the aqueous layer discarded. The ether layer was washed three times with 1 l. of water, dried over anhydrous magnesium sulfate, filtered, concentrated in vacuo and the concentrates heated at 110–120° C. for two hours with a crystal of iodine. The crude reaction product was "topped" through an 18-in. air-cooled Vigreux column and the distillate, B.P. 95–140°/0.1 mm. (158 g.), shown to be contaminated with cyclododecanone by vpc analysis. Cyclododecanone, B.P. 85–110°/0.1 mm., was "bled-away" from the desired 1-cyclohexyl-1-cyclododecene by distilling under vacuum at a pot temperature of 100° C. and column temperature of 130° C. for 4 hours. Vpc analysis of the pot residue showed no presence of cyclododecanone. The desired olefin was collected as a light yellow liquid boiling principally at 116°/0.07 mm. (136 g., 56% yield) and the IR spectrum showed no carbonyl band and a strong olefin band. The NMR spectrum of this olefin ($n_D^{25}$ 1.5478) agreed with the proposed structure and the vpc chromatogram showed the presence of both the cis and trans isomers. Calculated for $C_{18}H_{26}$: mol. wht. 242. Found: 253.

A mixture of 1-phenyl-1-cyclododecene (203.6 g., 0.84 mole), 15 g. of 5% rhodium-on-carbon and 500 ml. of methylcyclohexane were hydrogenated in a 2 l. autoclave at 3000 p.s.i. (200° C.) for 4.5 hours. The cooled reactants were filtered, concentrated in vacuo and the concentrates vacuum distilled. The desired hydrocarbon, cyclohexylcyclododecane, was collected as a water-white liquid boiling principally at 133–137°/0.1 mm. (198 g., 94% yield). NMR analysis of this hydrocarbon ($n_D^{25}$ 1.4960) showed no traces of vinylic or aromatic protons. Calculated for $C_{18}H_{34}$: C, 86.32; H, 13.68; mol. wht. 250.4. Found: C, 8628; H, 13.72; mol. wht. 258.

The viscosity of this tractant, as measured per ASTM method D445–61, was 30.58 cs. at 100° F. and 4.245 cs. at 210° F. The coefficient of traction was 0.070, as measured in the thrust bearing test machine.

It should be recognized that the tractants disclosed in Table I above and in the foregoing examples are illustrative only. There are many other compounds and mixtures within the scope of the present invention. Other exemplary compounds include dodecylbicyclohexyl, nonylbicyclohexyl, secdodecylcyclohexane, dissopropylibicyclohexyl, 1,3′-bis(1-piperidinyl)cyclohexane, 1,3-bis-(methylpentamethylenesilyl)propane, bis - (methylpentamethylenesilyl) ether, N,N′dimethyldodecahydro - 2,2′-bipyridyl, 1,4 - di(1 - morpholine)cyclohexane, N,N′ - dicyclohexylpiperazine, 1,3 - bis(cyclohexyldimethylsilyl) - 2,2-dimethyl-1,3-diaza - 2 - silacyclohexane, and tricyclohexylamine.

An outstanding feature of the present invention is the utilization of mixtures of various compounds as tractants. It is thus possible to approach optimum properties in a tractant through judicious selection of the compounds to be mixed. Viscosity is an important property in certain tractive applications. For example, in automotive tractive transmissions, desired viscosity properties for a tractant call for a minimum viscosity of 5.0 cs. at 210° F. and a maximum viscosity of 1800 cs. at 0° F., as measured per ASTM method D445–61. One exemplary tractant which approaches these properties is 2,3-dicyclohexyl-2,3-dimethylbutane. It has been found, however, that many compounds which have high coefficients of traction, but which are deficient in viscosity characteristics, can still be utilized as tractants. For example, a compound with excessive viscosity at low temperature can be made part of a carefully selected mixture to achieve the desired degree of viscosity reduction, i.e., provide a composition having a suitable pour point. Similarly, compounds or mixtures which are low in viscosity can be brought up to desired specifications with viscosity index (VI) improvers.

There are many VI improvers suitable for use with these tractants. Successful results have been obtained with polyalkyl methacrylates resulting from the polymerization of alkyl methacrylates in which the alkyl groups may have from about 2 to 16 carbon atoms and may be, for example, ethyl, propyl, butyl, amyl, hexyl, etc., and mixtures thereof. The alkyl groups may be mixtures such as derived from a mixture of alcohols, and in which case there may be included some alkyl groups having as low as 1 carbon atom and as high as about 18 carbon atoms. The number of carbon atoms in the alkyl group should be such that the polymer is compatible with the particular tractant being improved. The alkyl group is preferably a normal alkyl group, but may be a branched chain or cycloalkyl group. The molecular size of the polyalkylmethacrylate should be great enough to increase the viscosity of the formulated base stock, yet small enough to be compatible therewith.

One example of a suitable VI improver for use with tractants is a copolymer of butyl and lauryl methacrylate with a molecular weight of about 40,000. Another example is a terpolymer of butyl methacrylate, lauryl methacrylate, and vinyl pyrrolidone where the molecular weight is about 40,000. Still another VI improver is polyisobutylene prepared by acid-catalyzed polymerization of isobutylene up to a molecular weight between 20,000 and 40,000. Another is polyalkylstyrene prepared by polymerization of alkylstyrene, where the alkyl group is preferably lauryl, and the molecular weight is 45,000 to 50,000. Yet another VI improver useful in the present invention is a copylmer of vinyl acetate and alkyl fumarate having a molecular weight between 40,000 and 60,000.

The following examples illustrate the degree of viscosity improvement attainable with typical tractants and mixtures thereof. A commercially available VI improver was employed in a 3% by volume amount. The permissible concentration of a VI improver herein can vary considerably, and the amount to be chosen is naturally a function of a desired degree of viscosity change. Concentrations of 1% by volume were tested in each of the compounds of the following examples prior to the 3% by volume tests, although the results of the former are not presented. A practical range of VI improver addition for tractants is from about 0.3% to about 10% by volume, based on the tractant base stock.

EXAMPLE 15

Isopropylbicyclohexyl had an initial viscosity of 6.30 cs. at 100° F. and 1.81 cs. at 210° F., and a VI of 60 by ASTM method D67–53. To the base stock was added 3% by volume of a commercial VI improver. The VI improver comprised a copolymer of butyl methacrylate and lauryl methacrylate having a molecular weight range from about 80,000 to about 100,000, and wherein the lauryl group was a mixture of $C_{10}$ to $C_{18}$ normal chains. The result was a viscosity of 20.9 cs. at 100° F. and 6.22 cs. at 210° F., and a VI of 192.

EXAMPLE 16

2,2,4,4,13,13,15,15-octamethylhexadecane and 6-ethyl-2,2,4,4,11,11,13,13-octamethyltetradecane mixture had an initial viscosity of 25.02 cs. at 100° F. and 4.19 cs. at 210° F., and a VI of 62. The addition of 3% by volume of a commercial VI improver resulted in a viscosity of 54.58 cs. at 100° F. and 10.47 cs. at 210° F., and a VI of 151. The VI improver comprised a copolymer of butyl methacrylate and lauryl methacrylate having a molecular weight range from about 80,000 to about 100,000, and wherein the lauryl group was a mixture of $C_{10}$ to $C_{18}$ normal chains.

EXAMPLE 17

A 70%–30% mixture of 1,2- 1,3-tercyclohexyl had an initial viscosity of 35.37 cs. at 100° F. and 4.20 cs. at 210° F., and a VI of −76. The addition of 3% by volume of a commercial VI improver produced a viscosity of 57.80 cs. at 100° F. and 6.94 cs. at 210° F., and a VI of 79. The VI improver comprised a copolymer of butyl methacrylate and lauryl methacrylate having a molecular weight range from about 80,000 to about 100,000, and wherein the lauryl group was a mixture of $C_{10}$ to $C_{18}$ normal chains.

It has been shown above how the viscosity properties of tractants and tractant mixtures can be altered. It will now be shown how the tractive properties can be altered by means of mixtures. Experimental work under the present invention has revealed that, in general, the coefficient of traction of a mixture is approximately equal to the sum of the products of the coefficient and concentration of the respective components. This relationship is illustrated by the formula $$ft = ft_1 C_1 + ft_2 C_2 \ldots + ft_n C_n$$

where $ft$ = coefficient of traction of the mixture; $ft_1$, $ft_2$ and $ft_n$ = individual coefficients of traction of the components; and $C_1$, $C_2$ and $C_n$ = the respective concentrations of the components within the mixture.

In the experiments which defined the above formula, the following six components were employed:

Component A: a 40% hydrogenated terphenyl
Component B: 2,6,10,15,19,23-hexamethyltetracosane
Component C: 1,2-terphenyl
Component D: 70%–30% by volume mixture of 1,2- and 1,3-tercyclohexyl
Component E: n-octacosane
Component F: pentaerythritol tetravalerate All data were taken at a fluid temperature of 200° F., a linear ball velocity of 750 feet per minute, and a Hertz stress of 400,000 p.s.i. To aid interpretation of the test results, all coefficients of traction in the following tables are expressed in percent above or below the prior art coefficient of 0.060. Plus values are above and minus values are below 0.060.

Table IV below presents the measured coefficients of traction of Components A through F prior to mixing. These components with negative coefficient percentages, i.e., signifying a coefficient of less than 0.060, are outside the scope of this invention.

TABLE IV

| Component: | Coefficient of traction (percent above or below 0.060) |
| --- | --- |
| A | −12.0 |
| B | −0.1 |
| C | −28.4 |
| D | +19.3 |
| E | −52.7 |
| F | +2.2 |

The data in Table V below reflect the changes in cofficient of traction brought about through mixing of Component D with each of the others. In most of these binary mixtures, there was sufficient improvement to exceed the prior art coefficient of 0.060. The mixtures are stated in percent by volume. Test conditions were the same as those used for Table IV.

TABLE V

| Mixture: | Coefficient of traction (percent above or below 0.060) |
| --- | --- |
| 25% "A" and 75% "D" | +7.4 |
| 50% "A" and 50% "D" | +4.8 |
| 75% "A" and 25% "D" | +0.6 |
| 25% "B" and 75% "D" | +15.9 |
| 50% "B" and 50% "D" | +5.9 |
| 75% "B" and 25% "D" | +2.6 |
| 25% "C" and 75% "D" | +9.5 |
| 50% "C" and 50% "D" | −1.5 |
| 75% "C" and 25% "D" | −19.9 |
| 25% "E" and 75% "D" | +8.5 |
| 50% "E" and 50% "D" | −11.0 |
| 75% "E" and 25% "D" | −28.9 |
| 25% "F" and 75% "D" | +22.6 |
| 50% "F" and 50% "D" | +14.2 |
| 75% "F" and 25% "D" | −3.2 |

For purposes of the present invention, tractants have been described according to certain structural limitations and certain coefficient of traction requirements. Although not previously enunciated herein, there is a certain structural configuration which is often associated with higher coefficients of traction. This configuration is not to be considered as a limitation on the basic definition of tractants, but rather as a feature of a preferred class of tractants within the scope of this invention. Tractants of this invention can contain various acyclic hydrocarbon substituents, including those in which there are polymethylene chains, but this is not a required condition. When, however, there are polymethylene chains present, it has been found that a preferred range exists for these chains. Thus, where the structure comprises one or more carbon-containing saturated cyclic rings, superior tractive properties have been achieved where there are not acyclic polymethylene chain constitutents greater than trimethylene. Whereas, if the structure is acyclic with at least three quaternary carbon atoms, best results have been obtained where there are no acyclic polymethylene chain constitutents greater than hexamethylene.

Another preferred class of tractants within the scope of the present invention comprises those compounds having a coefficient of traction of at least about 0.06, and containing from about 15 to about 40 carbon atoms, up to 8 of which can be replaced by atoms selected from the group consisting of oxygen, nitrogen, phosphorus and silicon, and having at least one saturated carbon-containing cyclic ring having at least 6 and up to 24 member atoms.

The embodiments of this invention in which an exclusive property or privilege is claimed are defined as follows:

1. A method for improving the coefficient of traction between relatively rotatable members in torque transmitting relationship which comprises introducing to the tractive surfaces of said members a tractant having a coefficient of traction of at least about 0.06, said tractant containing from about 12 to about 70 carbon atoms, up to 8 of which can be replaced by atoms selected from the group consisting of oxygen, nitrogen, phosphorus and silicon, and said tractant having a structure selected from the group consisting of
  (a) at least 1 saturated carbon-containing cyclic ring having at least 6 member atoms; or
  (b) an acyclic structure in which there are at least 3 quaternary carbon atoms.

2. A method of claim 1 wherein the tractant contains from about 15 to about 40 carbon atoms and at least one saturated carbon-containing cyclic ring having at least 6 and up to 24 member atoms.

3. A method of claim 1 wherein the tractant has a carbocyclic structure.

4. A method of claim 1 wherein the tractant contains from about 15 to about 30 carbon atoms and from about 2 to about 3 cyclohexyl rings separated by no more than 3 carbon atoms.

5. A method of claim 1 wherein the tractant comprises an ester of a cycloalkane alkanoic acid having from 6 to 12 carbon atoms and derived from a cycloalkanol having from 6 to 12 carbon atoms and wherein the ester contains from about 13 to about 25 carbon atoms.

6. A method of claim 1 wherein the tractant comprises an ester of a cycloalkane alkanoic acid having from 6 to 12 carbon atoms and derived from a cycloalkanediol having from 6 to 12 carbon atoms and wherein the ester contains from about 13 to about 38 carbon atoms.

7. A method of claim 1 wherein the tractant contains from about 2 to about 5 cyclohexyl rings and from about 13 to about 30 carbon atoms, up to 4 carbon atoms outside the rings being replaceable by oxygen atoms, and wherein none of the oxygen atoms are adjacent each other.

8. A method of claim 1 wherein the tractant is selected from the group consisting of bicyclohexyl, nonylbicyclohexyl, tercyclohexyl, quatercyclohexyl, and quinquicyclohexyl.

9. A method of claim 1 wherein the tractant is selected from the group consisting of dicyclohexylmethane, dicyclohexylethane, and dicyclohexylpropane.

10. A method of claim 1 wherein the tractant is 2,3-dicyclohexyl-2,3-dimethylbutane.

11. A method of claim 1 wherein the tractant is cyclododecane.

12. A method of claim 1 wherein the tractant is 4-(1-methylethyl)bicyclohexyl.

13. A method of claim 1 wherein the tractant comprises a mixture of tractants having carbon-containing cyclic ring structure.

14. A method of claim 13 wherein the tractant is a 70%–30% by volume mixture of 1,2- and 1,3-tercyclohexyl.

15. A method of claim 1 wherein the tractant comprises a mixture of tractants having acyclic structure.

16. A method of claim 15 wherein the tractant is a mixture of 2,2,4,4,13,13,15,15-octamethylhexadecane and 6 - ethyl - 2,2,4,4,11,11,13,13-octamethyltetradecane.

17. A method for improving the coefficient of traction between relatively rotatable members in torque transmitting relationship which comprises introducing to the tractive surfaces of said members a tractant having a coefficient of traction of at least about 0.06, said tractant containing from about 12 to about 70 carbon atoms, up to 8 of which can be replaced by atoms selected from the group consisting of oxygen, nitrogen, phosphorus and silicon, said tractant having a structure selected from the group consisting of
  (a) at least 1 saturated carbon-containing cyclic ring having at least 6 member atoms; or
  (b) an acyclic structure in which there are at least 3 quaternary carbon atoms,
and said tractant having added thereto a VI improver in an amount effective to improve the viscosity index thereof.

18. A method of claim 17 wherein the VI improver is a polyalkylmethacrylate composition, containing an average of from about 4 to about 12 carbon atoms in the alkyl group, and is present in an amount of from about 0.3 to about 10 percent by volume based on the tractant base stock.

19. A tractive drive comprising at least two relatively rotatable members in torque transmitting relationship, the tractive surfaces of said members having disposed thereon a tractant having a coefficient of traction of at least about 0.06, said tractant containing from about 12 to about 70 carbon atoms, up to 8 of which can be replaced by atoms selected from the group consisting of oxygen, nitrogen, phosphorus and silicon, and said tractant having a structure selected from the group consisting of
  (a) at least 1 saturated carbon-containing cyclic ring having at least 6 member atoms; or
  (b) an acyclic structure in which there are at least 3 quaternary carbon atoms.

20. A tractive drive of claim 19 wherein the tractant contains from about 15 to about 40 carbon atoms and at least one saturated carbon-containing cyclic ring having at least 6 and up to 24 member atoms.

21. A tractive drive of claim 19 wherein the tractant has a carbocyclic structure.

22. A tractive drive of claim 19 wherein the tractant is selected from the group consisting of bicyclohexyl, nonylbicyclohexyl, tercyclohexyl, quatercyclohexyl, and quinquicyclohexyl.

23. A tractive drive of claim 19 wherein the tractant is selected from the group consisting of dicyclohexylmethane, dicyclohexylethane, and dicyclohexylpropane.

24. A tractive drive of claim 19 wherein the tractant is 2,3-dicyclohexyl-2,3-dimethylbutane.

25. A tractive drive of claim 19 wherein the tractant comprises a mixture of tractants having carbon-containing cyclic ring structure.

26. A tractive drive of claim 25 wherein the tractant is a 70%–30% by volume mixture of 1,2- and 1,3-tercyclohexyl.

27. A tractive drive of claim 19 wherein the tractant comprises a mixture of tractants having acyclic structure.

28. A tractive drive of claim 27 wherein the tractant is a mixture of 2,2,4,4,13,13,15,15-octamethylhexadecane and 6-ethyl-2,2,4,4,11,11,13,13-octamethyltetradecane.

29. A tractive drive comprising at least to relatively rotatable members in torque transmitting relationship, the tractive surfaces of said members having disposed thereon a tractant having a coefficient of traction of at least about 0.06, said tractant containing from about 12 to about 70 carbon atoms, up to 8 of which can be replaced by atoms selected from the group consisting of oxygen, nitrogen, phosphorus and silicon, said tractant having a structure selected from the group consisting of
  (a) at least 1 saturated carbon-containing cyclic ring having at least 6 member atoms; or
  (b) an acyclic structure in which there are at least 3 quaternary carbon atoms,
and said tractant having added thereto an VI improver in an amount effective to improve the viscosity index thereof.

30. A tractive drive of claim 29 wherein the VI improver is a polyalkylmethacrylate composition, containing an average of from about 4 to about 12 carbon atoms in the alkyl group, and is present in an amount of from about 0.3 to about 10 percent by volume based on the tractant base stock.

31. A tractive drive comprising an input toroidal disc and an output toroidal disc, a plurality of rollers in contiguity with said discs, loading means adapted to urge said discs against said rollers, ratio changing means adapted to vary the inclination of said rollers, and the tractive surfaces of said drive having disposed thereon a tractant having a coefficient of traction of at least about 0.06, said tractant containing from about 12 to about 70 carbon atoms, up to 8 of which can be replaced by atoms selected from the group consisting of oxygen, nitrogen, phosphorus and silicon, and said tractant having a structure selcted from the group consisting of
  (a) at least 1 saturated carbon-containing cyclic ring having at least 6 member atoms; or
  (b) an acyclic structure in which there are at least 3 quaternary carbon atoms.

No references cited.

FRED C. MATTERN, JR., *Primary Examiner.*

JAMES A. WONG, *Assistant Examiner.*